INVENTORS
GEORGE P. HICKS
STUART J. UPDIKE

BY *[signature]*
ATTORNEY

United States Patent Office 3,788,950
Patented Jan. 29, 1974

3,788,950
ENZYME GEL AND USE THEREFOR
George P. Hicks and Stuart J. Updike, Madison, Wis., assignors to E. I. du Pont de Nemours and Company, Wilmington, Del.
Continuation-in-part of application Ser. No. 631,716, Apr. 18, 1967. This application Aug. 5, 1970, Ser. No. 61,333
Int. Cl. G01n 31/14
U.S. Cl. 195—103.5 R     17 Claims

ABSTRACT OF THE DISCLOSURE

A substantially rigid enzyme gel, useful in processes incorporating enzyme catalysts, such as, substrate analysis, comprising a polymer matrix having water colloidally dispersed therein and active enzyme molecules distributed homogeneously throughout and substantially unreacted with the polymer matrix, the polymer matrix having a sufficiently small pore size to retain individual enzyme molecules, i.e. the enzyme in aqueous solution. The gel is formed by polymerizing an aqueous solution of a monomer, for example an acrylamide, containing an enzyme under conditions not detrimental to the activity of the enzyme.

CROSS REFERENCES TO RELATED APPLICATIONS

This application is a continuation-in-part of application Ser. No. 631,716, filed on Apr. 18, 1967 and now abandoned. This invention is related to the subject matter of co-pending application Ser. No. 631,717, filed on Apr. 18, 1967 and now U.S. Pat. 3,542,662 issued on Nov. 24, 1970, entitled Enzyme Electrode by inventors G. P. Hicks and S. J. Updike in that the enzyme electrode system disclosed and claimed therein may be used in the instant invention to determine a characteristic of an enzymatic reaction. This cross reference is not to be considered restrictive but merely exemplary of means which may be incorporated to measure a property of the aforementioned reaction.

SUMMARY OF THE INVENTION

Enzyme gels eliminate or reduce many of the disadvantages inherently associated with soluble enzyme systems. In the enzyme gel, the enzyme is entrapped within a polymer matrix having water colloidally dispersed therein, thereby allowing repeated use of a particular enzyme for different analyses, resulting in greater economy and reduction of error. Furthermore, noncompatible enzyme reactions can be effectively coupled by initiating each reaction sequentially in a series of columns containing different enzyme gels. Therefore, by placing several enzyme gel systems on a flowing stream, each with its own product detection system, several substrates can be analyzed simply and conveniently in a single sample. Thus, the use of enzyme gels promises to extend applications of enzymes and facilitate automation of complex analytical procedures. Other advantages will be apparent from the subsequent disclosure and the claims.

In accordance with the scope of the invention a substantially rigid enzyme gel is prepared by polymerizing at least a monomer in the presence of an enzyme in an aqueous solution. The gel is then shaped, mechanically or otherwise, into a desired configuration.

As described in greater detail hereinafter the aforementioned enzyme gel may be incorporated in a method of chemical analysis comprising contacting said enzyme gel with a substrate solution and determining a characteristic of the resultant enzymatic reaction by monitoring the concentration of at least one reactant or product of said reaction. (The term "monitoring," as used, encompasses any method adaptable for either directly or indirectly determining a desired concentration, e.g., measurement of conductivity, light absorbance, oxygen tension, etc.) It is to be realized that the enzyme gel may be embodied in either flowing or batch systems.

For a detailed understanding of the invention reference is made to the following description of various embodiments thereof and to the attendant drawings wherein:

FIG. 1 illustrates one form of apparatus which may be incorporated in methods based on the use of the subject enzyme gel;

FIG. 2 graphically depicts the effect of varying the number of enzyme gel particles in the system of FIG. 1;

Figure 1:
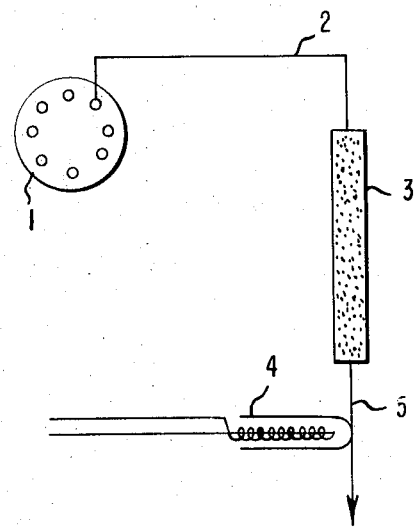

To facilitate understanding of the present invention, substantially rigid enzyme gels together with process for making the same will be first set forth followed by a description of methods and apparatus for ascertaining optimum gel variables and performing chemical analyses.

The initial requirement for the analytical application of an enzyme gel is that the insoluble enzyme must be prepared in a stable, reproducible reagent form, which can be used in a well-defined configuration for activity measurements. One approach to this problem is the instant invention, entailing the preparation of a stable enzyme gel which, preferably is lyophilized and has a uniform particle size.

The process of preparing the enzyme gel involves polymerizing a monomer compound in the presence of an enzyme while in an aqueous solvent. The compound must be polymerizable, either alone or with other compounds, into a substantially rigid gel and must be present in sufficient quantity to form such a gel.

One preferred type of gel has a cross-linked structure. This may result from polymerizing the compound by itself, or with others.

The polymerization may be initiated by catalyzing the solution with chemicals or light. It is also possible for the dissolved enzyme to produce a suitable catalyst.

Depending upon the monomers, enzymes, and catalysts, it may be necessary to adjust the pH prior to catalyzing the reaction or even dissolving the enzyme. The pH range of about 7 to 9 is generally satisfactory.

One advantage of this method of forming an enzyme gel is that individual enzyme molecules are homogeneously dispersed throughout the gel. This results in greater enzyme accessibility to the substrate and faster reaction rates. However, it requires that the gel pore size be sufficiently small to retain these individual enzyme molecules. A pore size of 35 A. will retain most enzymes.

An additional advantage of this method is that only aqueous solvents are used. Most enzymes denature when placed in a non-aqueous solvent, whereas very few denature in water. This method avoids placing enzymes in a destructive environment.

In one embodiment of making this gel, stock solution of monomer compound is made by dissolving 40 grams of acrylamide in 100 ml. of 0.1 M phosphate buffer, pH 7.4 and a cross-linking reagent is prepared by dissolving 2.3 grams of N,N-methylenebisacrylamide in 100 ml. of 0.1 M phosphate buffer, pH 7.4 (both solutions are stored at 5° C.). Gels are then prepared by mixing, in the desired proportions, the aforementioned solutions together with an enzyme solution.

Since oxygen inhibits the copolymerization that occurs in this system, it is preferable to deoxygenate the reagent mixture by purging with an inert gas, such as nitrogen, or other means before the addition of the enzyme solution. To catalyze the photopolymerization, riboflavin or potassium persulfate are preferably added. Upon photocatalysis, which may be conveniently performed, with a No. 2 photo floodlamp, the reaction should be complete within two to fifteen minutes, the end point being defined as the time taken for the gel to reach maximum opacity. To reduce the effect of heat denaturation of the enzyme during the exothermic reaction, the reaction container may be placed in an ice bath or other appropriate cooling means during the polymerization.

The catalyst best suited for polymerization of acrylics depends upon the gel composition. In general, mixtures with a high percentage of monomer polymerize more effectively with persulfate as a catalyst, while solutions with a higher percentage of cross-linking agent polymerize better with riboflavin and a photocatalyst. Gels can also be polymerized with no persulfate or riboflavin with a highly purified oxidase, and exposure to room light. The oxidase reaction consumes oxygen and generates $H_2O_2$ which apparently is sufficient for catalysis.

As is obvious to one skilled in the art, various other catalysts and buffer solutions may be used (with corresponding changes in reaction conditions) to polymerize the reactants to the final enzyme gel, e.g., catalysts, tetramethylenediamine and ammonium persulfate, with tris buffer, pH 8.6. The primary requisite that must be met is that the polymerization occur under conditions which do not inhibit final enzyme activity.

The pore size of an acrylamide gel is known to depend upon the concentration of the monomer compound prior to polymerization. Measured pore diameters vary from 17 A. for a 5% w./v. gel to 7 A. for a 35% gel (M. L. White, Journal of Physical Chemistry 64, 1563 (1960)). The theoretical values are slightly higher (S. Raymond and M. Nalamichi, Analytical Biochemistry 3 23 (1962)). Radioactively labelled albumin (rather than an enzyme) was incorporated in a gel formulated from 4.45% acrylamide and 0.55% N,N-methylenebisacrylamide. After 60 days, the gel retained approximately 40% of the originally dissolved albumin. This represented 75% of the albumin remaining after the initial washing of the gel. These results assume increased significance since enzyme molecules are generally much larger than albumin and would be expected to display increased retention times.

After the polymerization described above, the resulting block of polymerized enzyme gel may be mechanically dispersed into particles by, for example, first passing it through a #13 syringe needle and then through a #16 syringe needle to break the gel into even smaller particles. The suspension of gel particles is then washed, subjected to lyophilization, and sieved to a size between 20 and 40 mesh and stored in a dessicator at 5° C.

This 20 to 40 mesh enzyme gel is generically referred to as "E-G 20-40." Other configurations which may be used include blocks, strings, rods, coatings, and tubes. It is to be indicated, however, that the specification of enzyme gel activity, in contrast to soluble enzyme activity, is dependent upon the physical form and configuration of the enzyme gel system. (E-G 20-40 particles can be accurately weighed and packed into a column of standard dimensions permitting the determination of enzyme activity within ±5%.)

The technique of preparing E-G 20-40 enzyme gel particles may be applied to any compatible enzyme, e.g., glucose oxidase (GO) catalase, lactic dehydrogenase (LDH), amino acid oxidase, glutamic dehydrogenase, etc.

A series of E-G 20-40 enzyme gel particles having the same enzyme concentration (10 mg. of lactic dehydrogenase per 100 ml. of gel) but with different compositions of monomer and cross-linking agent were prepared to determine empirically the conditions for optimizing the two properties most useful in flowing stream systems, that is, mechanical rigidity and activity. All gels were prepared as previously indicated except that the ratios of the monomer and cross-linking reagents were varied. More dilute gels for a particular ratio were obtained by diluting the mixture of monomer and cross-linking agents with 0.1 M phosphate buffer, pH 7.4, before adding the enzyme and catalyst. A list of gel compositions and properties are shown below. The relative activities indicated therein were based on the preferred gel composition listed in column 1 of the table being 100.

Best mechanical rigidity was obtained at higher gel concentrations (higher concentrations of monomer and cross-linking agent in the gel) over the concentration range studied. At any one concentration, increasing the percent of cross-linking agent decreased mechanical rigidity, but favored a higher yield of enzyme gel activity per unit of soluble enzyme activity introduced before polymerization.

Enzymes may be trapped by polymerizing only the cross-linking agent. Such a gel, however, is very soft, sediments slowly, and is unsuitable for use in flowing system applications. On the other hand, high gel concentrations tend to reduce the activity of the gel at a given percentage of cross-linking agent. The most suitable gel material requires both a relatively high concentration of monomer to lend mechanical rigidity and a high concentration of cross-linking agent to achieve the highest possible yield of enzyme gel activity. The concentration of cross-linking agent is limited by its solubliity in aqueous solutions, which is less than 3 grams per 100 ml.

TABLE 1.—CHARACTERISTICS AND ACTIVITY OF ENZYME-GEL PARTICLES PREPARED WITH DIFFERENT GEL RECIPES

| Total grams monomer plus cross linking agent per 100 ml. of monomer plus crosslinking agent solutions | 8.2 | [1] 5.0 | [1] 5.0 | 11.1 | 14.7 | [1] 5.0 | 5.8 | [1] 5.0 | 4.1 | 3.2 |
|---|---|---|---|---|---|---|---|---|---|---|
| Percent acrylamide monomer | 81 | 90 | 95 | 90 | 95 | 81 | 32 | 32 | 49 | 68 |
| Percent N,N-methylenebisacrylamide crosslinking agent | 19 | 10 | 5 | 10 | 5 | 19 | 68 | 68 | 51 | 32 |
| Relative activity of enzyme gel particles | 100 | 66 | 60 | 32 | 8 | White, opaque, minimally active, unsatisfactory for use due to poor rigidity which caused columns to plug. | | | | |
| Mechanical rigidity | [2] | [3] | [2] | [2] | [2] | | | | | |
| Appearance | [4] | [5] | [6] | [5] | [6] | | | | | |

[1] Diluted with 0.1 M phosphate buffer, pH 7.4, before adding enzyme and catalysts.
[2] Excellent.
[3] Fair.
[4] White, opaque.
[5] White, slightly opaque.
[6] Clear.

The preferred gel of column 1 was prepared by mixing 1 ml. of the acrylamide solution and 4 ml. of the N,N-methylenebisacrylamide solution with 1 ml. of an enzyme solution (containing from 0.1 to 20 mg. of enzyme) and adding approximately 0.03 mg. of riboflavin and potassium persulfate. Unless otherwise indicated, all data disclosed hereinafter was obtained by using E-G 20-40 enzyme particles of the preferred gel composition.

An insoluble enzyme gel matrix, such as that described above, can be used as an analytical tool by packing the material into a column. Enzyme gel columns are preferably prepared by equilibrating a dry weight of E-G 20-40 for about an hour in a buffer solution, then transferring quantitatively to a column. For example, GO and LDH E-G 20-40 are hydrated prior to transfer in 0.2 M acetate buffer, pH 4.15 and 0.1 M phosphate buffer, pH 7.4, respectively. When the enzyme gel column is perfused with a solution containing the substrates for the enzyme entrapped in the gel, the enzyme reaction is catalyzed by the enzyme gel in the column converting all or portion of the substrates to a product. The products thus formed emerge from the column free of enzyme activity. The effluent stream containing the formed products can be measured by an appropriate detection system. The detection system may be conductometric, electrochemical (FIG. 1), photometric (FIG. 4), fluorometric, sensitivity to pH, etc. An exact description of the detection system is not essential for consideration of the enzyme gel material as an analytical tool.

In order to be useful for an analytical measurement, the amount of product formed during passage through the enzyme gel column must be proportional to the amount of substrate entering the column, thereby forming the basis for the enzymatic measurement of substrate concentrations. For the measurement of substrates, the substrates may be either quantitatively converted to products during passage through the column, or the conversion may be incomplete with the amount of product formed or reactant consumed being proportional to the amount of substrate entering the column. Under conditions where the conversion of the substrate is incomplete and, effectively, the rate of a chemical reaction which is catalyzed by the enzyme gel material is being measured, the concentrations of activators and inhibitors for the enzyme entrapped in the gel can also be measured. Thus, an enzyme gel column can be used directly in a system for the determination of substrates, activators and inhibitors, e.g., the continuous determination of glucose based on the subsequent reaction:

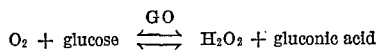

In this reaction, GO catalyzes the oxidation of glucose to gluconic acid and hydrogen peroxide. Since the samples (substrate solutions) are equilibrated with the oxygen tension of air and glucose is the sought for constituent, GO is the only reagent which must be added to the system for analysis. By providing an enzyme gel and using an electrochemical method for measuring oxygen tension (see our copending application Ser. No. 631,717, now U.S. Pat. 3,542,662) a "reagentless" determination of glucose is achieved.

One form of apparatus which may be used to study is illustrated in FIG. 1 wherein a sample turntable 1 introduces a sample of an oxygen-equilibrated, glucose-containing solution into the influent stream 2 at a fixed flow rate and subsequently through an enzyme gel column 3. An electrochemical means 4, such as the enzyme electrode in application Ser. No. 631,717, then monitors the oxygen concentration in the effluent stream 5.

The following example will serve to illustrate the operation of the apparatus in FIG. 1 and more clearly characterize the optimum properties of enzyme gels used therein. In this study, enzyme gel particles with initial concentrations of 750 mg., 80 mg., and 30 mg. of purified glucose oxidase per 100 ml. of gel were used. The enzyme gel particles, GO E-G 20–40 were placed in a miniature chromatographic column made from a 4 cm. length of capillary tubing 1.5 mm. in diameter. A nylon net cemented with epoxy resin to the downstream end of the capillary tube held the enzyme gel particles in the flowing stream. Samples were pumped through the column at 0.4 ml./minute with a peristaltic pump. An automatic sample turntable changed the samples at the rate of 20/hour. An oxygen electrode was used with a recording electrometer to monitor the oxygen content of the enzyme gel effluent stream.

Figure 2:
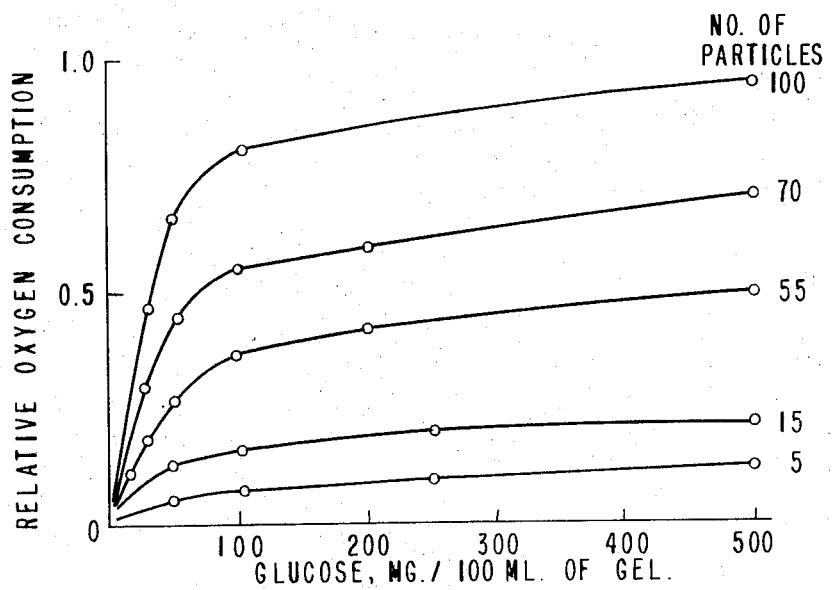

FIG. 2 shows the amount of oxygen consumed when enzyme gel columns were perfused with glucose solutions containing from 20 to 500 mg. of glucose per 100 ml. of 0.1 M phosphate buffer, pH 7.4. Each solution was allowed to equilibrate with the oxygen tension of room air before placing the sample in the sample turntable. The various response curves in FIG. 2 were obtained with capillary columns packed with from 8 to 100 enzyme gel particles (750 mg. of glucose oxidase per 100 ml. of gel). The initial shapes of the response curves were essentially the same for all column sizes, giving a proportional response with glucose concentration up to about 50 mg./100 ml. and very little or no increase in response with glucose concentrations above 100 mg. of glucose per 100 ml. The data in FIG. 2 demonstrates that for the enzyme gel particles used, the useful linear working range of 0–50 mg. of glucose per 100 ml. is nearly independent of the number of gel particles contained in the column. Increasing the number of particles in the column gives a greater response for a given concentration of glucose, but does not appreciably vary the linear portion of the response curve. The data from similar experiments using capillary columns packed with 100 GO E-G 20–40 enzyme gel particles having different enzyme gel concentrations are presented in FIG. 3. When the amount of enzyme in the gel is decreased the linear portion of the useful working range of the response curve is increased.

Figure 3:
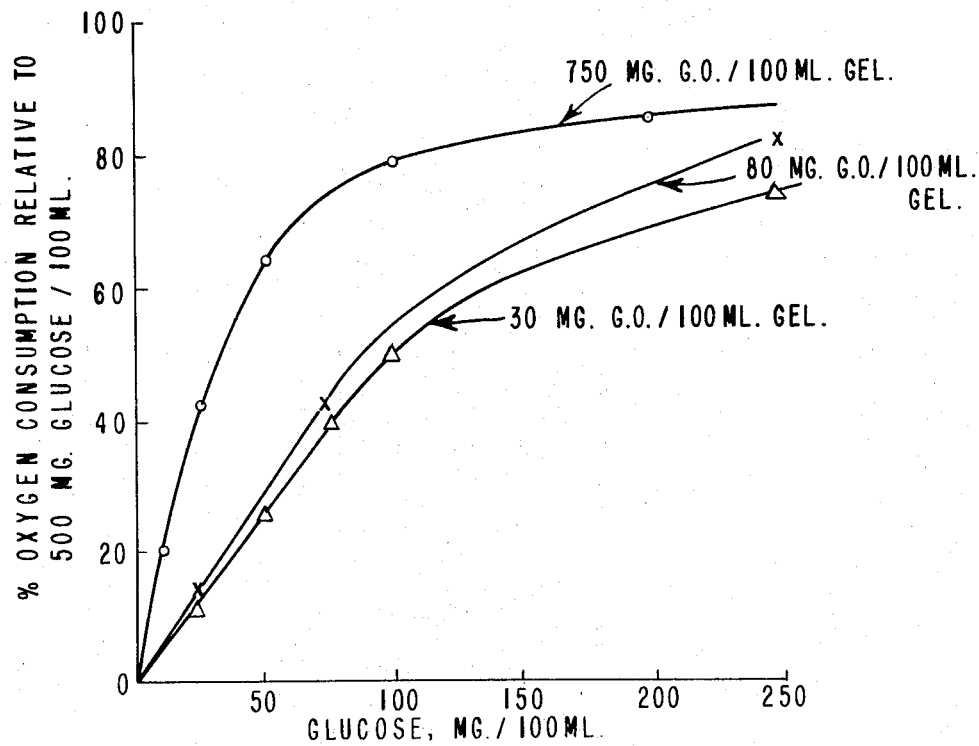
FIG. 3 shows the relationship between enzyme concentration in the gel and the useful analytical range of the system of FIG. 1.

From the data in FIGS. 2 and 3, the parameters which affect the useful range and sensitivity of a continuous analysis system based upon enzyme gel activity are apparent. Within the limits of excessive oxygen consumption which would affect the rate of the enzyme reaction, increased sensitivity can primarily be obtained by placing more enzyme gel particles into the capillary column. The useful working range, on the other hand, is more dependent upon the characteristics of the enzyme gel material and cannot practically be extended by increasing or decreasing the number of gel particles in the column. To change the linear range, the enzyme contained in the enzyme gel material should be changed. These data suggest that at sufficiently high enzyme gel concentrations all of the substrate which diffuses into the gel is consumed and the rate of reaction is diffusion limited. As the amount of enzyme in the gel is decreased, so that all of the glucose which diffuses into the gel is not consumed by the reaction system, the rate of reaction is also limited by the enzyme in the gel and the linear range of the analysis system is extended.

A major advantage of using enzyme gel activity for continuous chemical analysis is that the primary reagent requirement, the enzyme, is not consumed during the substrate analysis, and in this sense is eliminated as a reagent requirement. By using an enzyme electrode as the sensing device, a "reagentless" analyzer is achieved. Any system in which oxygen is a reactant or product of the enzymatic reaction, in particular a substrate, lends itself to the application of this reagentless method. Using the same principle, it is possible to determine blood urea nitrogen, adding no reagents, by providing an urease gel column and measuring the change of conductivity in the effluent stream.

To further illustrate the scope of the invention, enzyme gels may also be used to carry out the following methods. One of the methods employs a portion of the same system previously described for glucose oxidase, with additional reagents, based on the subsequent generic reaction.

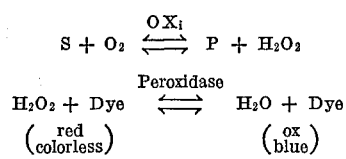

In the first reaction, when a column of oxidase enzyme gel ($OX_1$) is perfused with substrate (S) and $O_2$, products (P) and $H_2O_2$ are produced. The $H_2O_2$ in the column effluent stream is detected in the second reaction by measuring the increase in absorbance of an oxidized blue dye ($\text{dye}_{ox}$, o-tolidine) at 620 m$\mu$ in the presence of a second enzyme, peroxidase.

A second method, for the detection of dehydrogenase activity, is set up in conjunction with the following reactions.

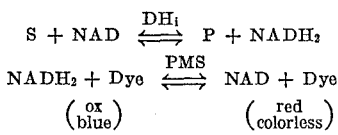

In the first reaction, when a column of dehydrogenase enzyme gel ($DH_1$) is perfused with a mixture of substrates (S) and nicotinamide adenine dinucleotide (NAD), reduced NAD ($NADH_2$) and products (P) are produced. The concentration of $NADH_2$ in the column effluent stream is measured in the second reaction as the decrease in the absorbance of an oxidized blue dye ($\text{Dye}_{ox}$, 2,6-dichlorophenolindophenol) at 620 m$\mu$ in the presence of a catalyst, phenazine methosulfate (PMS).

Figure 4:
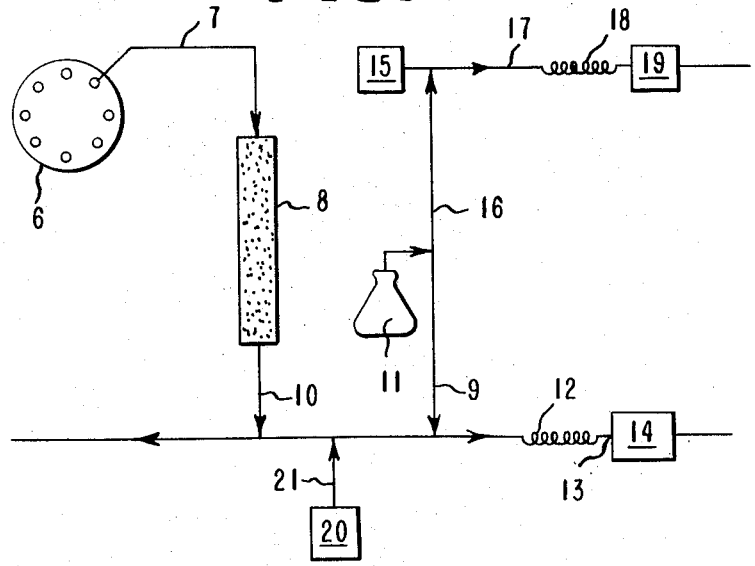
FIG. 4 illustrates another form of apparatus which may be used in methods based on the use of the subject enzyme gel.

These methods are preferably performed by the apparatus of FIG. 4 wherein, as before, a sample turntable 6 introduces samples of substrate solutions into influent stream 7 and then into column 8 packed with E-G 20-40 enzyme gel particles. A portion of the effluent stream 10 from the column is mixed with a stream 9 of either dehydrogenase or oxidase color reagent 11 to detect the reaction products in effluent stream 10. After passing through a short delay line 12, to permit the color reaction to proceed, the reaction stream 13 passes through a photometer cell 14.

The color reagent 11 is also mixed with a buffer or control solution 15 by means of stream 16 and the combined stream 17 is passed through a second delay line 18 and photometer cell 19 to serve as a reagent blank. The steady state absorbance difference between the two photometer cells is a measure of the product concentration in the effluent stream from the column. Standard solutions 20 are introduced into the stream 21 to permit calibration of the photometric system.

By simple adaptation enzyme gels may also be employed effectively in stirred batch systems. Further, enzyme gels may be used for catalyzing enzymatic reactions to prepare particular products or remove undesired substrates. This is especially important in biological systems, where the presence of certain compounds, e.g. oxygen, is often detrimental.

What is claimed is:

1. An enzyme gel comprising particles of a matrix of a polymer having water colloidally dispersed therein and molecules of an active enzyme distributed homogeneously throughout and unsubstantially reacted with said water and said matrix of said polymer, said matrix of said polymer having sufficiently small pore size to retain individual molecules of said enzyme, said enzyme gel being formed from at least about 8.0% by weight of a polymerizable composition consisting essentially of at least about 5% by weight of cross-linking agent and sufficient monomer so that said enzyme gel is substantially rigid when placed in an aqueous solution.

2. The enzyme gel of claim 1 wherein said polymer is formed from a polymerizable composition from about 5% to about 37% by weight of cross-linking agent.

3. The enzyme gel of claim 2 wherein said polymer is an acrylic polymer.

4. The enzyme gel of claim 2 wherein said polymer is an acrylamide polymer.

5. The enzyme gel of claim 2 wherein said pore is smaller than about 35 A.

6. The enzyme gel of claim 2 wherein said cross-linked polymer is a polymer of acrylamide and N,N-methylene-bisacrylamide.

7. The enzyme gel of claim 2 wherein the said enzyme is selected from the group consisting of dehydrogenases and oxidases.

8. The enzyme gel of claim 2 wherein said enzyme is lactic dehydrogenase.

9. The enzyme gel of claim 2 wherein said enzyme is glucose oxidase.

10. A method of performing a chemical analysis of an unknown substrate solution comprising (1) contacting a substantially rigid enzyme gel with the substrate solution, said enzyme gel comprising a matrix of a polymer having water colloidally dispersed therein and molecules of an active enzyme distributed homogeneously throughout and substantially unreacted with said water and said matrix of said polymer, said enzyme gel being formed from at least about 8% by weight of a polymerizable composition consisting essentially of at least about 5% by weight of a cross-linking agent and sufficient monomer so that said enzyme gel is substantially rigid, said matrix of said polymer having a sufficiently small pore size to retain individual molecules of said enzyme, and (2) determining the characteristic of any resulting enzymatic reaction by monitoring the concentration of at least one component of said reaction.

11. A method of preparing an enzyme gel comprising
  (a) dissolving in an aqueous solvent to form a solution;
    (1) a polymerizable composition comprising at least one compound capable either alone or with other compounds of forming a substantially rigid polymer in the presence of said solvent, and
    (2) an enzyme;
  (b) polymerizing said polymerizable composition in the presence of said solvent to form a gel, said solution being formed from at least about 8% by weight of polymerizable composition and said polymerizable composition consisting essentially of at least about 5% by weight of a cross-linking agent and sufficient monomer so that the gel formed is a substantially rigid gel; and
  (c) forming particles from said gel,
the concentration of said compound in said solution being such that said gel is substantially rigid and composed of a matrix having a pore size sufficiently small to retain individual molecules of said enzyme within said matrix.

12. The method of claim 11 wherein:
  (a) said monomer is acrylamide;
  (b) said cross-linking agent is N,N-methylenebisacrylamide dissolved in said solvent in a concentration about 1/20 to 1/4 of the concentration of said acrylamide;
  (c) said enzyme is an oxidase, and
  (d) said solution is exposed to light.

13. The method of claim 11 wherein said polymerizable composition comprises from about 5% to about 37% by weight cross-linking agent.

14. The method of claim 13 wherein said pore size is smaller than about 35 A.

15. The method of claim 13 wherein
  (a) said monomer is acrylamide;
  (b) said cross-linking agent is N,N-methylenebisacrylamide dissolved in said solvent in a concentration about 1/20 to 1/4 of the concentration of said acrylamide, and
  (c) a catalyst selected from the group consisting of riboflavin, potassium persulfate, tetramethylene-diamine and ammonium persulfate is added to said solvent.

16. The method of claim 15 wherein prior to dissolving said enzyme in said solvent, a buffer is added to said solvent to adjust the pH to a value of about from 7 to 9.

17. The method of claim 15 wherein after said acrylamide, N,N-methylenebisacrylamide, and catalyst are added to said solvent, said solution is irradiated with light to photocatalyze said polymerization.

References Cited

UNITED STATES PATENTS 3,046,201  7/1962  White et al. ......... 115—100

OTHER REFERENCES

Raymond et al.: "Anal. Biochem.," 3:23–30 (1962).
Bernfeld et al.: "Science," 142:678–9 (1963).
White: "J. Phys. Chem.," 64:1563–5 (1960).
"Z Naturforsch," Wieland et al., vol. 21:1003 (October 1966).

A. LOUIS MONACELL, Primary Examiner
M. D. HENSLEY, Assistant Examiner

U.S. Cl. X.R.

195—103.5 C, 63, Dig. 11